United States Patent [19]
Upton

[11] 3,794,013
[45] Feb. 26, 1974

[54] PORTABLE GAS GRILL
[76] Inventor: Orville C. Upton, 7421-Vandenberg, Sacramento, Calif. 95820
[22] Filed: May 15, 1972
[21] Appl. No.: 253,048

[52] U.S. Cl. .................. 126/40, 126/39 H, 126/50
[51] Int. Cl. .............................................. F24c 3/08
[58] Field of Search ......... 126/40, 50, 41, 39 H, 38; 99/425

[56] References Cited
UNITED STATES PATENTS
1,563,026  11/1925  Hollands .............................. 126/40
541,534  6/1895  Haffcke .............................. 126/41 R Primary Examiner—Edward G. Favors

[57] ABSTRACT

A portable gas grill to permit outdoor cooking consists of a grill plate supported on removable legs and having a gas burner suspended therebeneath. The grill plate has a drain to drain the collected grease therefrom. A portable gas tank containing liquified petroleum gas is attached to the burner with a flexible hose to provide a source of gas for the burner regardless of the location of the burner.

1 Claim, 3 Drawing Figures

PATENTED FEB 26 1974   3,794,013

PORTABLE GAS GRILL

BACKGROUND OF THE INVENTION

FIELD OF THE INVENTION

The present invention relates to portable gas cooking grills.

SUMMARY OF THE INVENTION

A portable gas cooking grill for indoor or outdoor use includes a grill plate having an upstanding flanged edge and a grease drain connected thereto. The grill plate is supported on removable legs and has a gas burner suspended therebeneath. A liquified petroleum gas container of a portable size is connected to the burner by means of a flexible hose.

The primary object of the invention is to provide a portable gas grill for indoor and outdoor use.

Other objects and advantages will become apparent in the following specification when considered in the light of the attached drawings.

DESCRIPTION OF THE PREFERRED EMBODIMENT

Figure 1:
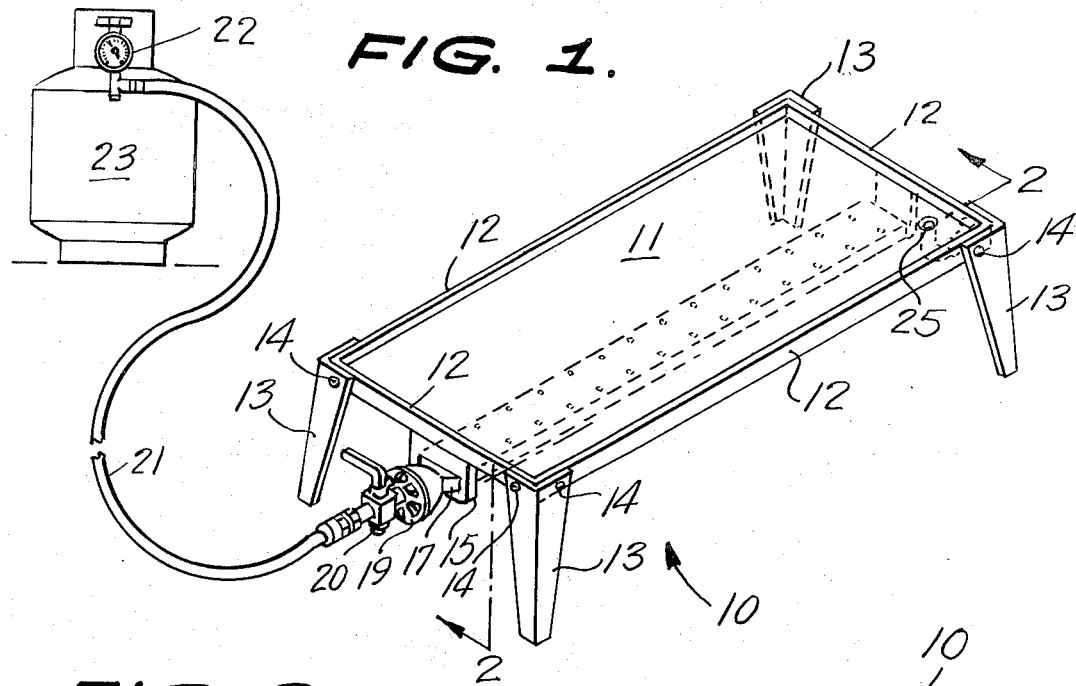
FIG. 1 is a perspective view of the invention.
Figure 2:
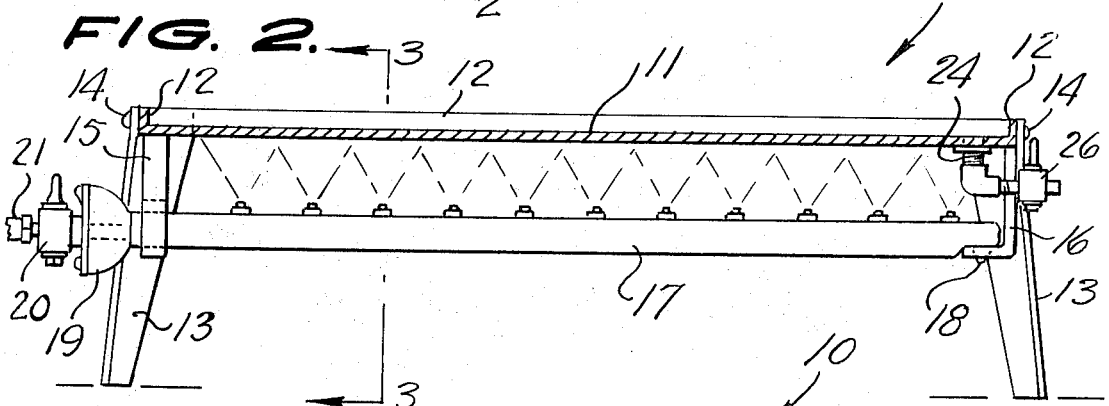
FIG. 2 is an enlarged fragmentary vertical sectional view taken along the line 2—2 of FIG. 1 looking in the direction of the arrows.
Figure 3:
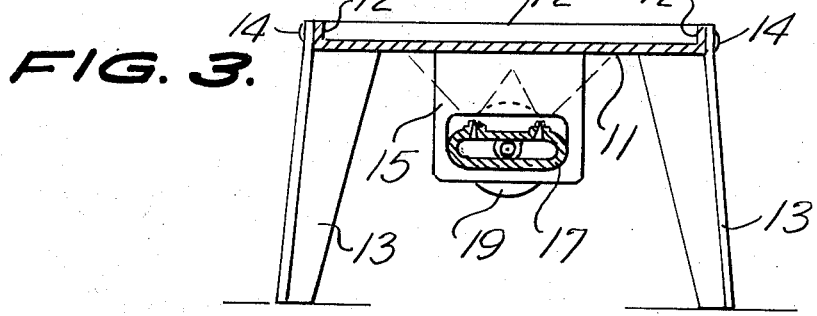
FIG. 3 is a transverse sectional view taken along the line 3—3 of FIG. 2 looking in the direction of the arrows.

Referring now to the drawings in detail wherein like reference characters indicate like parts throughout the several figures the reference numeral 10 indicates generally a portable gas grill constructed in accordance with the invention.

The portable gas grill 10 includes a generally rectangular cast metal grill plate 11 having an upstanding flange 12 integrally formed on the peripheral edges thereof. A plurality of legs 13 are detachably secured to the corners of the grill plate 11 by means of screws 14. The legs 13 are formed of angle iron material and taper inwardly toward their lower ends.

A burner support block 15 is secured to the grill plate 11 at one end thereof in depending relation thereto. An angle support bracket 16 is secured to the opposite end of the grill plate 11 in aligned relation to the support block 15. A gas burner 17 extends through the burner support block 15 and is supported on the bracket 16 with its retaining pin 18 extending downwardly through the bracket 16.

An air control aspirator 19 is secured to the burner 17 and forms a part thereof. A control valve 20 is provided on the burner 17 to control the flow of gas thereto. A flexible hose 21 is connected to the valve 20 at one end and to a pressure reducer valve 22 mounted on a portable liquified petroleum gas tank 23.

A grease drain 24 extends through an opening 25 in the bottom of the grill plate 11 and has a valve 26 connected thereto controlling the flow of grease from the grill plate 11.

In the use and operation of the invention the legs 13 are assembled to the grill plate 11 and the flexible hose 21 is connected to the gas tank 23 at one end and to the burner 17 at the other end. The legs 13 are then supported from a generally level surface and the burner 17 is ignited to heat the grill plate 11. Cooking is carried on the grill plate 11 in a conventional manner with excess grease being drained through the drain opening 25. After completion of the cooking operation the legs 13 are removed from the grill plate 11 and the flexible hose 21 is disconnected from the burner 17 and from the portable fuel tank 23. The grill may then be packed for moving on to the next location.

Liquified petroleum gas used in the tank 23 may be butane, propane or any other available liquified petroleum gas.

Having thus described the preferred embodiment of the invention it should be understood that numerous structural modifications and adaptations may be resorted to without departing from the spirit of the invention.

I claim:

1. A portable gas grill comprising a generally flat cast metal grill plate, a flange integrally formed on the peripheral edge of said plate and extending upwardly therefrom, a burner positioned beneath said plate, a plurality of legs detachably secured to said plate in depending relation thereto, a liquified petroleum portable fuel tank, a flexible hose connecting said portable fuel tank with said burner a burner support block rigidly secured in depending relation to one end of said grill plate, a burner suport bracket rigidly secured in depending relation to the other end of said grill plate, a grease drain opening extending through said grill plate, a grease drain conduit, communicating with said grease drain opening, and a valve in said grease drain conduit for controlling the flow of grease from said grill plate.

* * * * *